(No Model.)
P. PRYIBIL.
SAW TABLE GAGE.
No. 503,726. Patented Aug. 22, 1893.
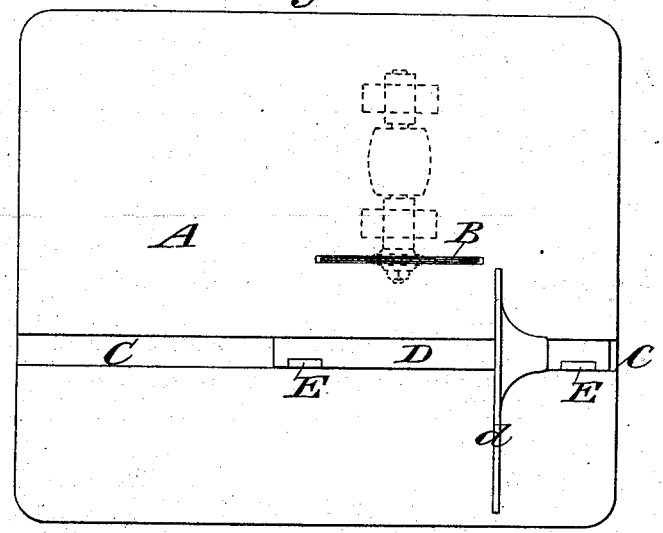
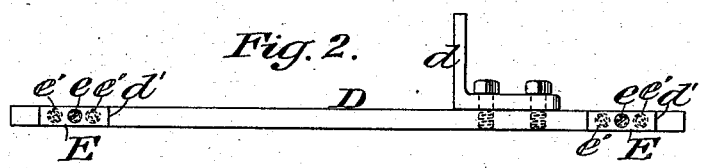
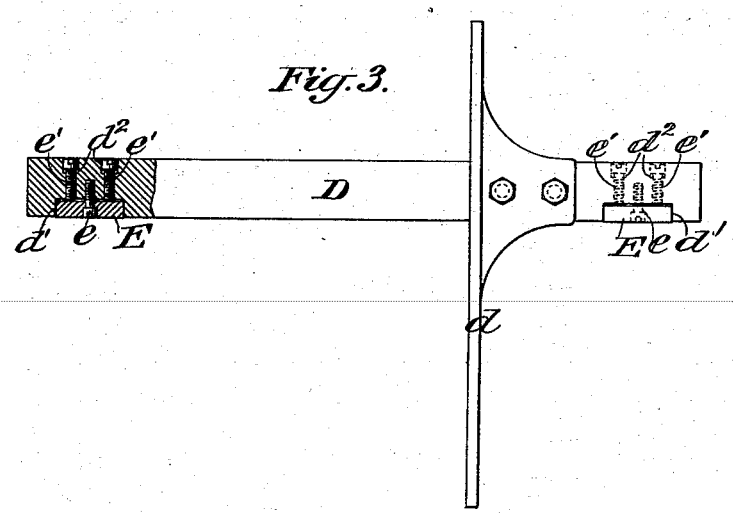
Witnesses:
C. Sundgren
George Barry.
Inventor:
Paul Pryibil
by attorneys
Brown Duval

UNITED STATES PATENT OFFICE.

PAUL PRYIBIL, OF NEW YORK, N. Y.

SAW-TABLE GAGE.

SPECIFICATION forming part of Letters Patent No. 503,726, dated August 22, 1893.

Application filed September 17, 1892. Serial No. 446,212. (No model.)

*To all whom it may concern:*

Be it known that I, PAUL PRYIBIL, of New York, in the county and State of New York, have invented a new and useful Improvement in Saw-Table Gages, of which the following is a specification.

My invention relates to an improvement in cross-cut slides for circular saw tables in which provision is made for taking up wear and thereby enabling the work to be accurately presented to the saw.

A practical embodiment of my invention is represented in the accompanying drawings in which—

Figure 1 is a top plan view of a table and saw, showing the position of the guide thereon. Fig. 2 is a front edge view of the guide. Fig. 3 is a top plan view of the guide, partly in section.

A represents the table and B the saw projecting up through the table, as is usual. The table is provided with a groove C extending along its surface in the direction in which the work is to be fed to the saw. A tongue D is fitted to slide within the groove C and has fixed thereto a guide cheek or fence $d$ against which the work is to be held as it is moved up into engagement with the saw. The repeated forward and backward sliding movement of the tongue D within the groove C has the effect of wearing away to a greater or less extent, either the walls of the groove, or sides of the tongue, or both, and when such wear has taken place, there is a tendency to present the work to the saw slightly out of tone, a very amazing feature where accurate work is required. To take up any such wear which may take place, I provide the tongue—preferably near its opposite ends—with movable gibs under the control of forcing devices, which serve to increase the bearing width of the tongue at the points where the gibs are located. The gibs are represented by E and are seated in recesses $d'$ in the side of the tongue, one near each end. A set screw $e$ extending from the outer face of the gib through into the side of the tongue D, serves to hold the gib firmly pressed against the ends of two adjusting screws $e'$ engaged with screw threaded sockets $d^2$ in the tongue and extending through from the side of the tongue opposite that on which the gib is located.

What I claim is—

The combination with the supporting table provided with a groove, of a guide provided with a tongue having a recess in its side and adapted to slide along the groove, a gib having a sliding movement in the recess in the tongue in a direction transverse to the tongue, set screws seated in the tongue and bearing against the gib for forcing it bodily outward and a set screw engaged with the gib and the tongue for holding the gib against the aforesaid outwardly forcing screws, substantially as set forth.

PAUL PRYIBIL.

Witnesses:
 THOS. J. FARRELL,
 GEORGE BARRY.